(12) United States Patent
Yliaho et al.

(10) Patent No.: US 9,213,434 B2
(45) Date of Patent: Dec. 15, 2015

(54) PIEZOELECTRIC ACTUATOR AND METHOD

(71) Applicant: Nokia Corporation, Espoo (FI)

(72) Inventors: Marko Tapani Yliaho, Tampere (FI);
Pasi Tuomo Antero Kemppinen,
Tampere (FI); Jouni Aslak Pääaho,
Kangasala (FI)

(73) Assignee: Nokia Technologies Oy, Espoo (FI)

( * ) Notice: Subject to any disclaimer, the term of this patent is extended or adjusted under 35 U.S.C. 154(b) by 132 days.

(21) Appl. No.: 13/943,914

(22) Filed: Jul. 17, 2013

(65) Prior Publication Data

US 2015/0022459 A1   Jan. 22, 2015

(51) Int. Cl.
*G06F 3/041*   (2006.01)

(52) U.S. Cl.
CPC .................... *G06F 3/0414* (2013.01)

(58) Field of Classification Search
CPC ..... G06F 3/041; G06F 3/0412; G06F 3/0414; G06F 3/0416; G06F 3/045
USPC .................................................. 345/173, 174
See application file for complete search history.

(56) References Cited

U.S. PATENT DOCUMENTS

| | | | |
|---|---|---|---|
| 6,492,979 B1 | 12/2002 | Kent et al. ...................... | 345/173 |
| 7,890,778 B2 | 2/2011 | Jobs et al. ...................... | 713/300 |
| 2005/0078093 A1 | 4/2005 | Peterson, Jr. et al. ......... | 345/173 |
| 2006/0140439 A1 | 6/2006 | Nakagawa .................... | 381/431 |
| 2008/0055277 A1 | 3/2008 | Takenaka et al. ............. | 345/177 |
| 2009/0176534 A1* | 7/2009 | Lee et al. ...................... | 345/173 |
| 2010/0090564 A1* | 4/2010 | Oh et al. ....................... | 310/328 |
| 2010/0225600 A1 | 9/2010 | Dai et al. ....................... | 345/173 |
| 2011/0261021 A1 | 10/2011 | Modarres et al. ............. | 345/177 |
| 2011/0279382 A1 | 11/2011 | Pertuit et al. ................. | 345/173 |
| 2013/0227495 A1* | 8/2013 | Rydenhag et al. ............ | 715/863 |
| 2013/0335211 A1 | 12/2013 | Kobayashi ................ | 340/407.2 |

FOREIGN PATENT DOCUMENTS

| | | |
|---|---|---|
| EP | 2026173 A1 | 2/2009 |
| EP | 2315101 A1 | 4/2011 |
| EP | 2479642 A1 | 7/2012 |
| EP | 2492782 A1 | 8/2012 |
| WO | WO-2012/025783 A1 | 3/2012 |
| WO | WO-2012/052803 A1 | 4/2012 |
| WO | WO-2012/090031 A1 | 7/2012 |
| WO | WO-2012/114754 A1 | 8/2012 |
| WO | WO-2012/129247 A2 | 9/2012 |

OTHER PUBLICATIONS

Patently Apple; "Apple Looking to deliver a little More Buzz to iOS Devices"; Mar. 22, 2012; whole document (7 pages); Retrieved from the Internet at http://www.patentlyapple.com/patently-apple/2012/03/apple-looking-to-deliver-a-little-more-buzz-to-ios-devices.html.

* cited by examiner

*Primary Examiner* — Regina Liang
(74) *Attorney, Agent, or Firm* — Harrington & Smith

(57) ABSTRACT

An apparatus including a display; and at least one piezoelectric member connected to the display. The at least one piezoelectric member is configured to move the display. When the display is pressed to mechanically stress the at least one piezoelectric member, the apparatus is configured to wake up the apparatus from a sleep mode based upon electricity from the at least one piezoelectric member, and/or determine a location where the display was pressed based upon respective signals from at least two of the piezoelectric members.

24 Claims, 16 Drawing Sheets

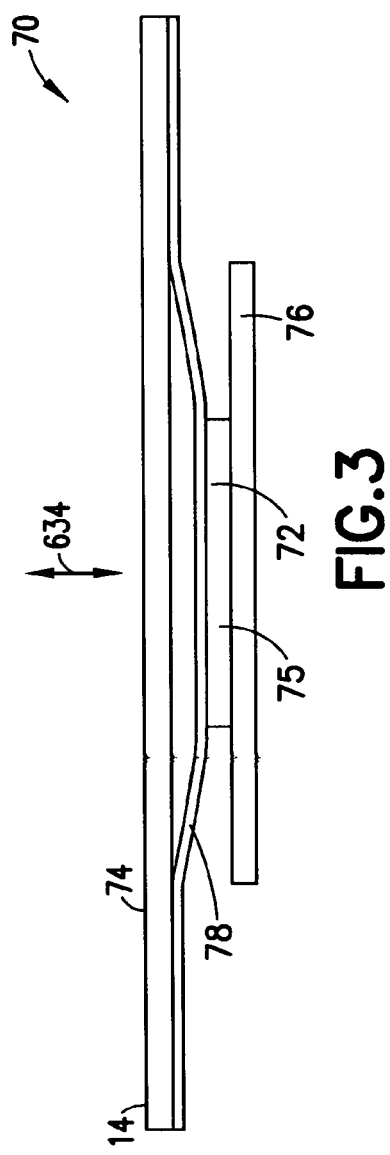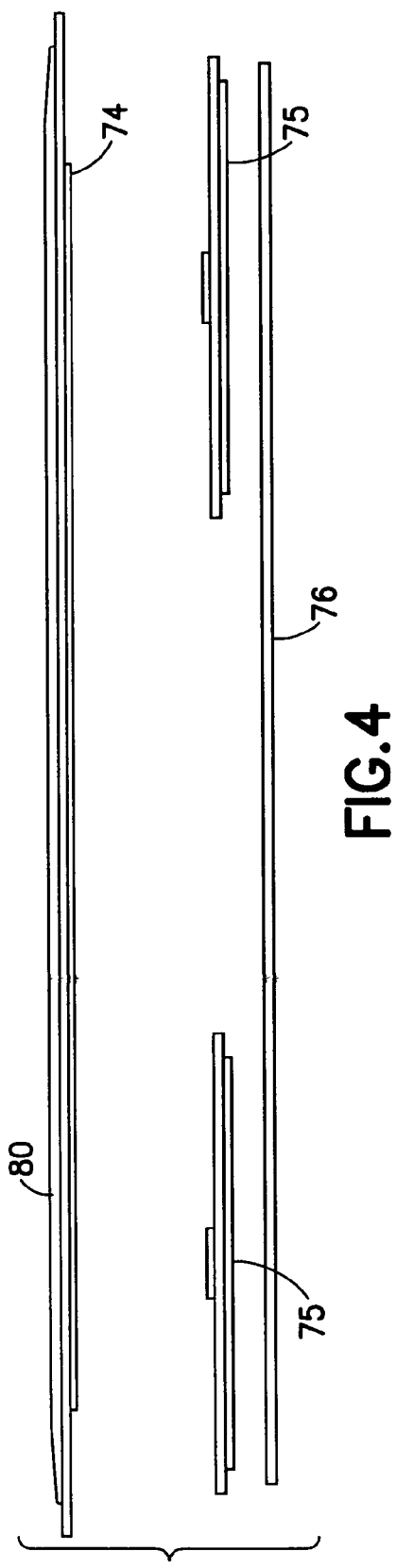

PIEZOELECTRIC ACTUATOR AND METHOD

BACKGROUND

1. Technical Field

The exemplary and non-limiting embodiments relate generally to an input device and method and, more particularly, to a device and method which uses a piezoelectric member.

2. Brief Description of Prior Developments

Use of a piezoelectric member as an input device is known. Providing a piezoelectric member behind an electronic display for haptic feedback is known.

SUMMARY

The following summary is merely intended to be exemplary. The summary is not intended to limit the scope of the claims.

In accordance with one aspect, an example embodiment is provided in apparatus including a display; and at least one piezoelectric member connected to the display. The at least one piezoelectric member is configured to move the display. When the display is pressed to mechanically stress the at least one piezoelectric member, the apparatus is configured to wake up the apparatus from a sleep mode based upon electricity from the at least one piezoelectric member, and/or determine a location where the display was pressed based upon respective signals from at least two of the piezoelectric members, and/or signal a gesture made on the display based upon respective signals from at least two of the piezoelectric members.

In accordance with another aspect, an example method comprises pressing a display of an apparatus to mechanically stress at least one piezoelectric member connected to the display; and generating electricity from the at least one piezoelectric member from the mechanical stress to wake up the apparatus from a sleep mode, and/or determine a location where the display was pressed based upon the respective electricity from at least two of the piezoelectric members.

In accordance with another aspect, an example embodiment is provided in non-transitory program storage device readable by a machine, tangibly embodying a program of instructions executable by the machine for performing operations, the operations comprising waking up an apparatus from a sleep mode based upon electricity from the at least one piezoelectric member which has been mechanically stressed to generate the electricity from pressing of a display of the apparatus connected to the at least one piezoelectric member, and/or determining a location where the display was pressed based upon respective electricity from at least two of the piezoelectric members generated by the pressing of the display.

BRIEF DESCRIPTION OF THE DRAWINGS

The foregoing aspects and other features are explained in the following description, taken in connection with the accompanying drawings, wherein:

FIG. 3 is a schematic sectional view of one of the audio display modules shown in FIG. 1;

FIG. 4 is a schematic exploded side view of portion of the apparatus shown in FIG. 1;

DETAILED DESCRIPTION OF EMBODIMENTS

Figure 1:
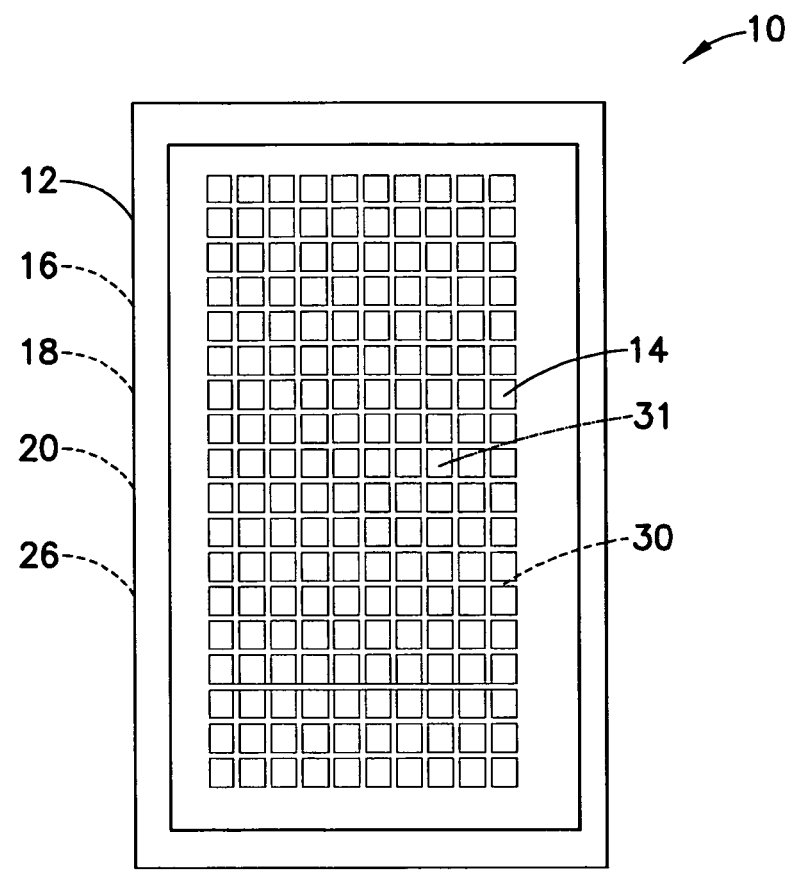
FIG. 1 is a front view of an example embodiment of an apparatus.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 is a hand-held communications device which includes a telephone application. In an alternate example the apparatus might not comprise a telephone application. In the example shown in FIG. 1, the apparatus 10 may also comprise an Internet browser application, camera application, video recorder application, music player and recorder application, email application, navigation application, gaming application, and/or any other suitable electronic device application, such as may be provided on a smartphone or tablet computer for example. Referring to both FIGS. 1 and 2, the apparatus 10, in this example embodiment, comprises a housing 12, a display module 14, a receiver 16, a transmitter 18, a rechargeable battery 26, and a controller 20 which may include at least one processor 22, at least one memory 24, and software 28. However, all of these features are not necessary to implement the features described below. For example, features as described herein may be used in a non-portable apparatus which does not have a battery.

The receiver 16 and transmitter 18 form a wireless mobile communication interface to allow the apparatus 10 to communicate with a wireless telephone system, such as a mobile telephone base station for example. The wireless mobile communication interface 16, 18 may allow the apparatus 10 to communicate such as by 4G, 4G LTE, 3G, CDMA, etc. for example. However, in an alternate example embodiment the receiver 16 and transmitter 18 might not be provided, such as when the apparatus 10 does not have telephone capabilities. For example, the apparatus 10 might merely be a gaming device or a music/video player. However, for a device having telephone capability, cellular circuit switched telephony or VoIP may be provided for example. So, a cellular system transmitter and receiver are not necessarily needed, such as if the device has only VoIP call functionality. However, even with a device which has VoIP call functionality, the device most likely may have a transmitter and a receiver for Wi-Fi. Internet access for the apparatus 10 might be provided by a short range communications system through a television console or a wireless WLAN for example. These are only some examples, and should not be considered as limiting.

Referring also to FIG. 3, the display module 14 forms a speaker 70 comprising a vibrating element 72 and a display element 74. The display element 74, in this example, is a touch screen display which functions as both a display screen and as a user input. The display element 74 may comprise a touch input device (TID) 30, such as a capacitive sensor 31 for example (see FIG. 1). However, features described herein may be used in a display which does not have a capacitive touch sensor. Alternatively, another example may comprise an apparatus which has a touchpad or touch-panel which is not part of an electronic display screen. The electronic circuitry inside the housing 12 may comprise a printed wiring board (PWB) having components such as the controller 20 thereon. The circuitry may include a sound transducer provided as a microphone.

In this example the vibrating element 72 comprises at least one piezoelectric member 75 connected to a printed circuit board 76. Piezoelectric material may be on either one, or both sides of a carrier plate. The display element 74 is an electronic display. A member 78 connects the piezoelectric member 75 to the back side of the display element 74. The piezoelectric member 75 is flexed by the printed circuit board 76. This causes the piezoelectric member 75 to move the electronic display 74 in and out as illustrated by arrow 634 to generate sound waves from the front of the electronic display 74.

Figure 5:
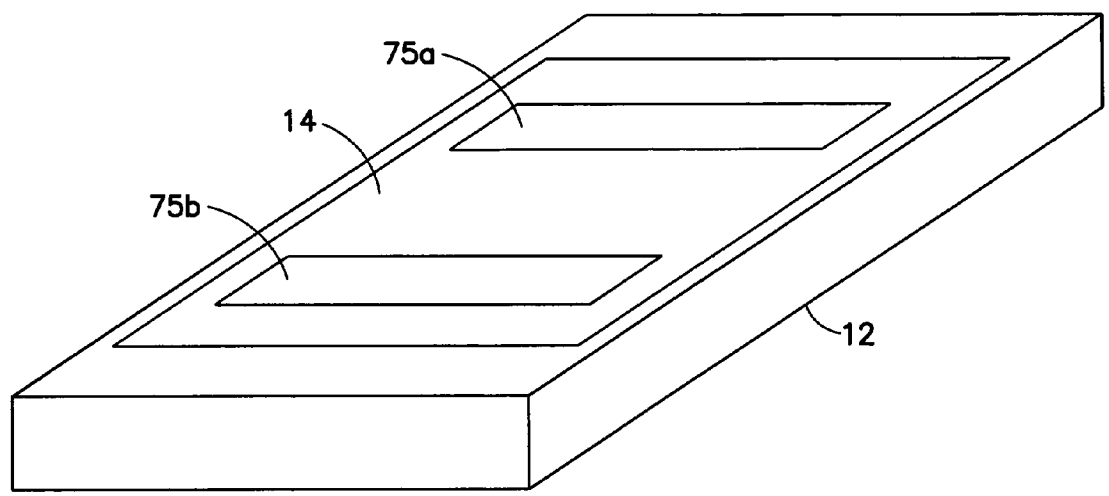
FIG. 5 is a perspective view of the apparatus shown in FIG. 1 illustrating the location of the vibrating elements relative to the display.

Referring also to FIGS. 4 and 5, in this example the apparatus comprises two of the piezoelectric members 75 connected to the back side of the display element 74. The piezo actuators may be directly coupled to the display module or might not be directly coupled to the display module. The speaker in a broader definition may comprise additional element(s). For example, a speaker may have a plate under the display module where the piezos may be used to actuate the plate so that the plate could move/vibrate the display in a z-direction (634). A window plate 80 may be provided on the front face of the display element 74. In an alternate example embodiment, rather than a piezoelectric member, the vibrating element may comprise vibrating of the display with a dynamic actuator such as speaker or vibra.

Features as described herein may fundamentally utilize implementation of an "Audio Display" or "panel speaker" concept which has been developed by Nokia Corporation. In the Audio Display concept, generally, at least one piezo actuator may be suitably coupled to the display module for sound generation so that the display module can be used as a conventional display, but further for sound generation and perhaps tactile feedback. In alternative embodiments of Audio Display integrations, the piezo actuator may be coupled to the display window (in front of the display module) for sound generation. There are various ways of reproducing sound waves in the direction of the display module. The audio display module 14 is configured to function as a display and also function as a speaker or sound transducer.

Figure 2:
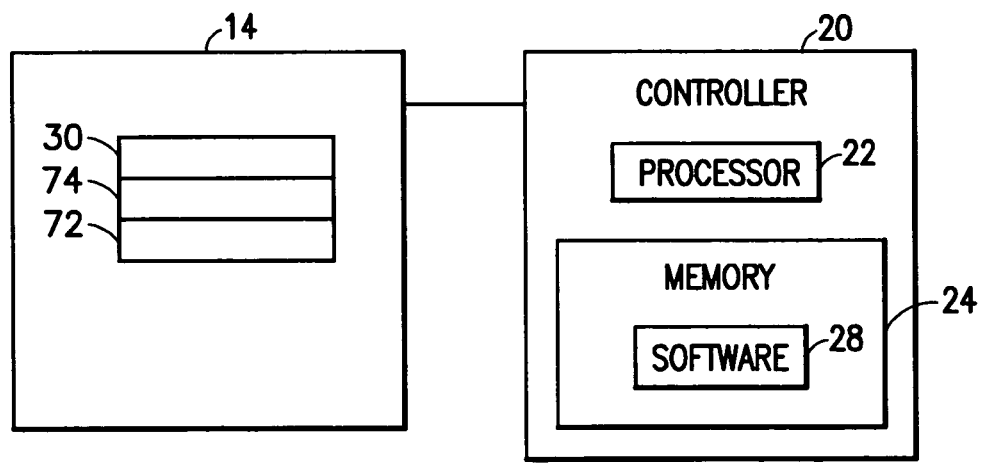
FIG. 2 is a schematic diagram illustrating some of the components of the apparatus shown in FIG. 1.

As seen in FIG. 2, the audio display module 14 is connected to the controller 16. The controller 16 is configured to control display of images on the display element 74, and also control generation of sound from the audio display module 14. The source of the images and sounds may comprise any suitable source(s), such as applications, video, data from the Internet, television signals, etc. The audio signals sent to the audio display module 14 may be formed or controlled by the controller. The audio signals may be telephone voice signals from a telephone conversation. In this example the audio display module 14 is configured to provide an electronic display feature, an audio speaker feature and a haptic feedback feature. However, the haptic feedback feature might not be provided in an alternate embodiment. In another alternate example the haptic feedback feature might be provided without the display module 14 providing an audio speaker feature.

Figure 6A:
FIGS. 6A-6C illustrate movements associated with a piezoelectric member.
Figure 6B:
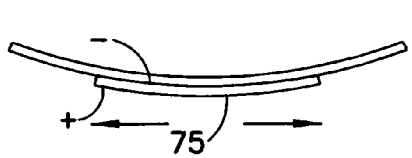
Figure 6C:
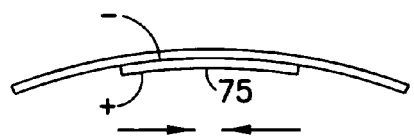

The panel speaker concept is able to drive the display stack with actuators under the stack to produce localized haptics and also audio. The actuators are connected to the display usually from the middle and to the device frame usually from the ends, or visa versa. The used actuator may be a piezoelectric, such as a piezoceramic for example, which will deform when electric field is applied to it. In conjunction with non-piezoelectric material, the piezo will bend and thus it works as an actuator. Respectively, electric charge accumulates in the piezo in response to applied mechanical stress such as bending. FIG. 6A illustrates a piezoelectric member 75 in a home position. FIG. 6B illustrates the piezoelectric member 75 when mechanical stress is applied. This mechanical stress results in generation of electricity which may be used by the apparatus as described further below. FIG. 6C illustrates the piezoelectric member 75 when a voltage is applied. This may be used for haptic feedback and/or audio from the display 74 for example. FIG. 6B also corresponds to when a voltage is applied opposite to that as shown in FIG. 6C. Features as described herein may use two or more piezoelectric actuators under the display to detect touch location and force on the display, detect the movement of an object (such as a finger for example) on the display, and recognize movement patterns on the display.

Since piezos can create electric charge as a result of mechanical stress, that feature can be used to trigger some functionality in the apparatus 10, such as waking a CPU that is in sleep mode for example. As a result of that, this mechanism can be used instead of a separately powered touch sensor, at least in some use cases, resulting in better power efficiency. The piezos used may be provided primarily for other purpose(s) such as for providing haptics and/or audio. Thus, features as described herein may use piezos which are already in the apparatus and available for use.

Figure 7:
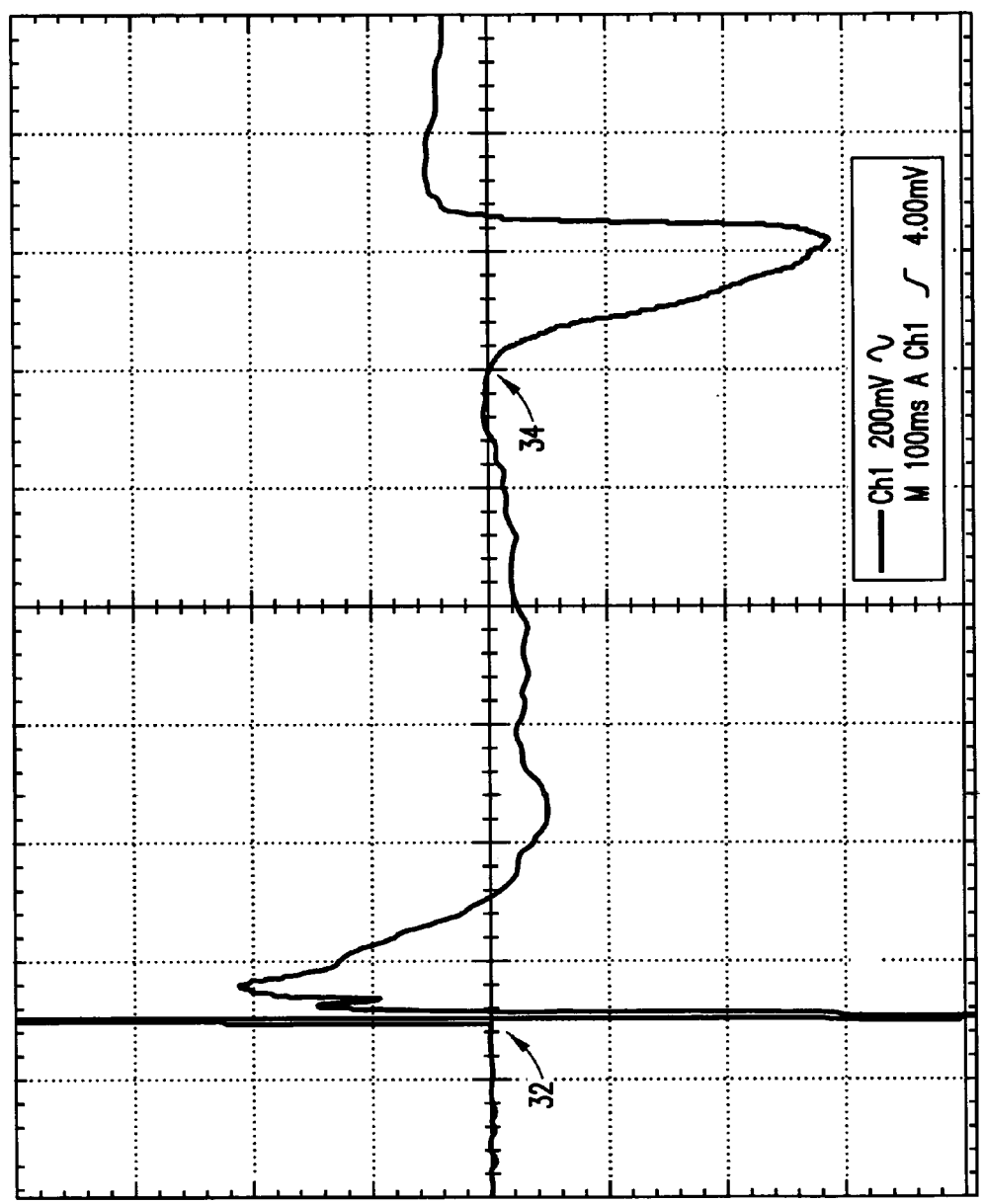
FIG. 7 is a graph illustrating voltage from a piezoelectric member under the display experiencing a touch mechanical stress.

FIG. 7 shows a graph of voltage as a function of time in one of the piezoelectric actuators 75 when the apparatus is touched using a "normal" touch UI force by a user's finger for example. One can see that the voltage level is so high that it can be easily measured when the finger touches the display (32 on the left). One square means 200 mV in this graph. Lifting the finger from the display can be measured as well (34 on the right). These measurements were with a 10 kOhm load resistance connected to the piezo, and voltage was measured with an oscilloscope in AC coupling mode.

Figure 8:
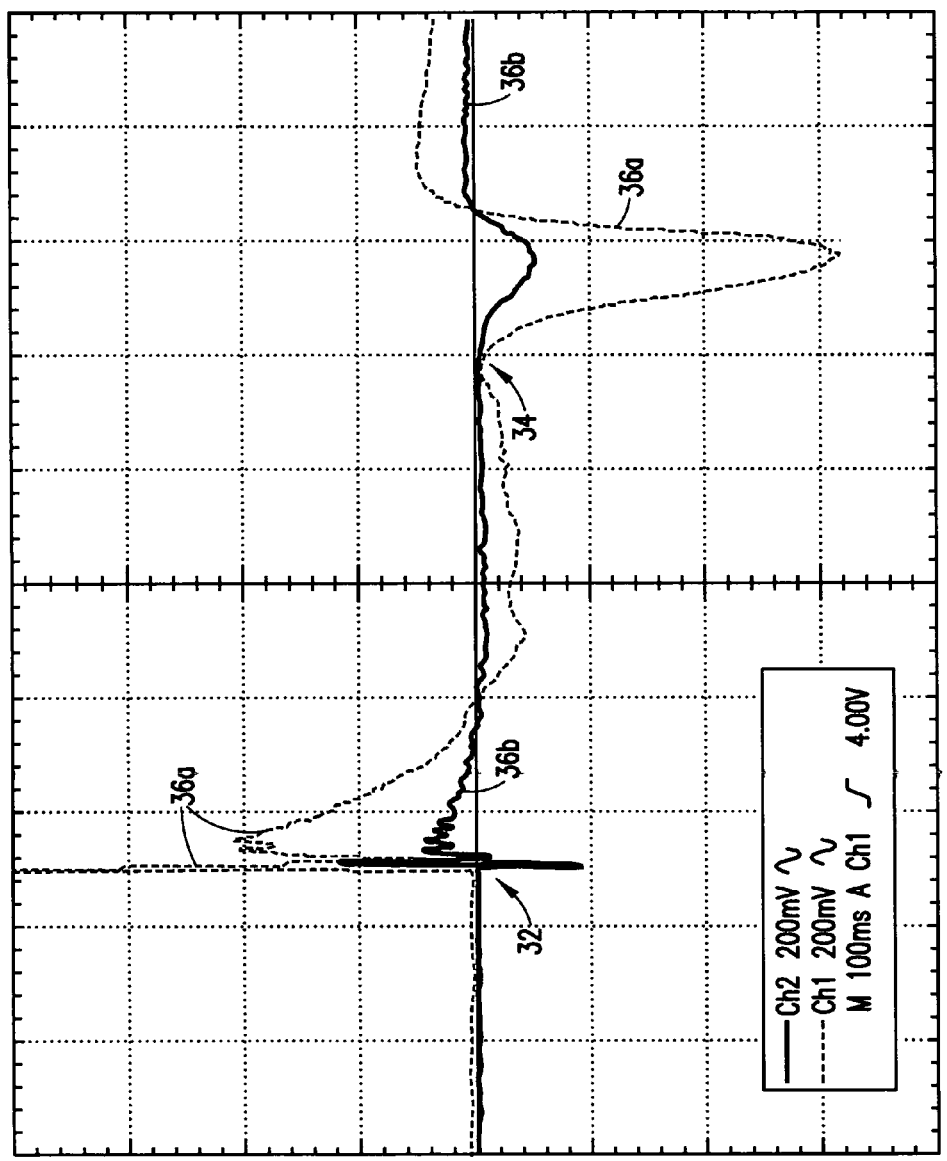
FIG. 8 is a graph illustrating voltage from the piezoelectric members under the display shown in FIG. 5 experiencing a touch mechanical stress.

FIG. 8 shows voltage as a function of time for the two piezoelectric actuators 75 when touched using a "normal" touch UI force over the other piezo. One can see, the voltage difference between the piezos is so high that it can be easily measured. Line 36a is for the first piezoelectric actuator shown in FIGS. 4-5 and line 36b is for the second piezoelectric actuator shown in FIGS. 4-5. In this example the finger touched the display closer to the first piezo than the second piezo. Thus, the curve 36a is the voltage of the first, closer piezo and the curve 36b is the voltage of the second, farther piezo. One can also see that the voltage difference between the piezos is so high that it can be easily measured that the finger lifting from the display (as indicated by 34) was closer to the first piezo than the second piezo.

Figure 9:
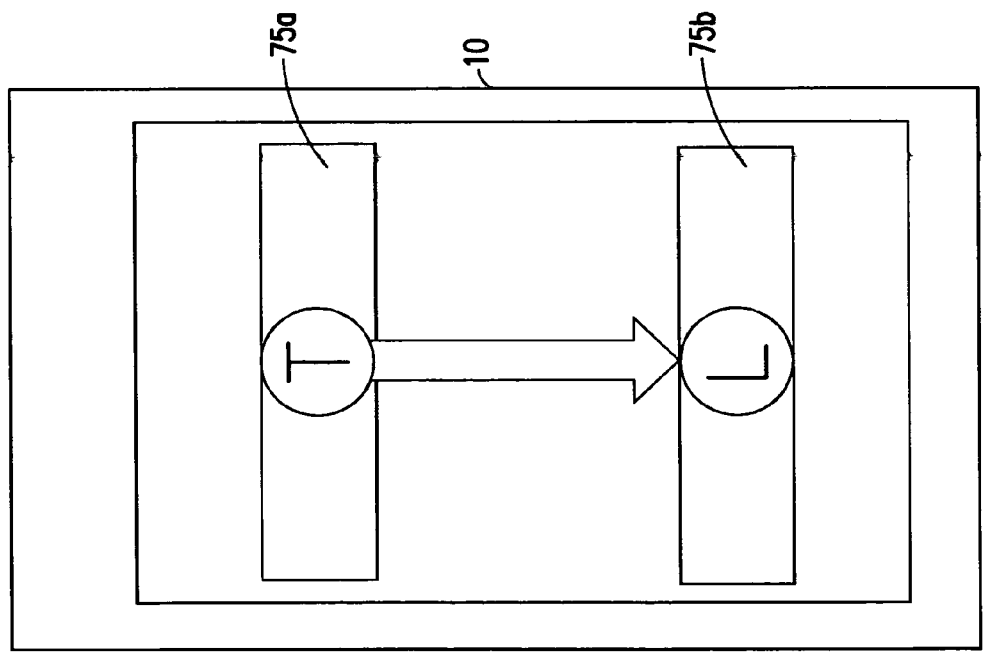
FIG. 9 is diagram illustrating a use case of touching the display of the apparatus shown in FIGS. 1 and 5.
Figure 10:
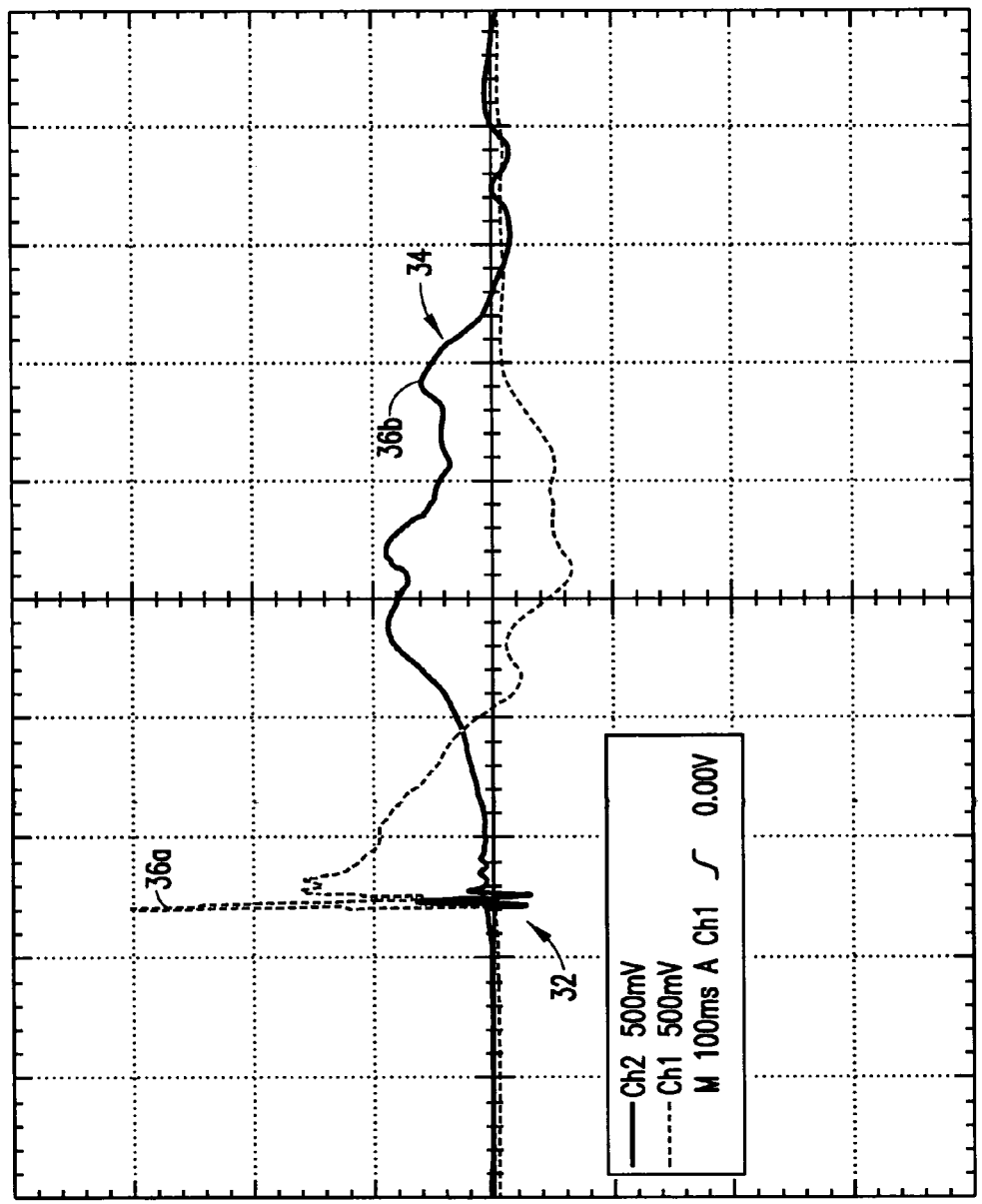
FIG. 10 is a graph illustrating voltages from a piezoelectric members under the display corresponding to the touch indicated in FIG. 9.

FIG. 9 shows when the display of the apparatus 10 is touched using a "normal" touch UI force over the first piezo 75a, then the finger was moved towards the second piezo 75b. The finger is touching the display during the movement, and then the finger is lifted from the display near the second piezo 75b. T stands for touch, and L stands for lift. FIG. 10 shows the voltages as a function of time in the two piezoelectric actuators during the touch T, movement and subsequent lift L of FIG. 9. From the voltage differences it can be seen that the finger touched the display near the first piezo 75a (curve 36a), because the first piezo 75a has a higher voltage than the second piezo 75b (curve 36b) at event 32. During finger movement the voltage in the first piezo 75a decreases and voltage in the second piezo 75b increases. The apparatus may be able to recognize the gesture T-L on the display shown in FIG. 9 via the signals shown in FIG. 10 and perform a predetermined function based upon that recognized gesture.

Figure 11:
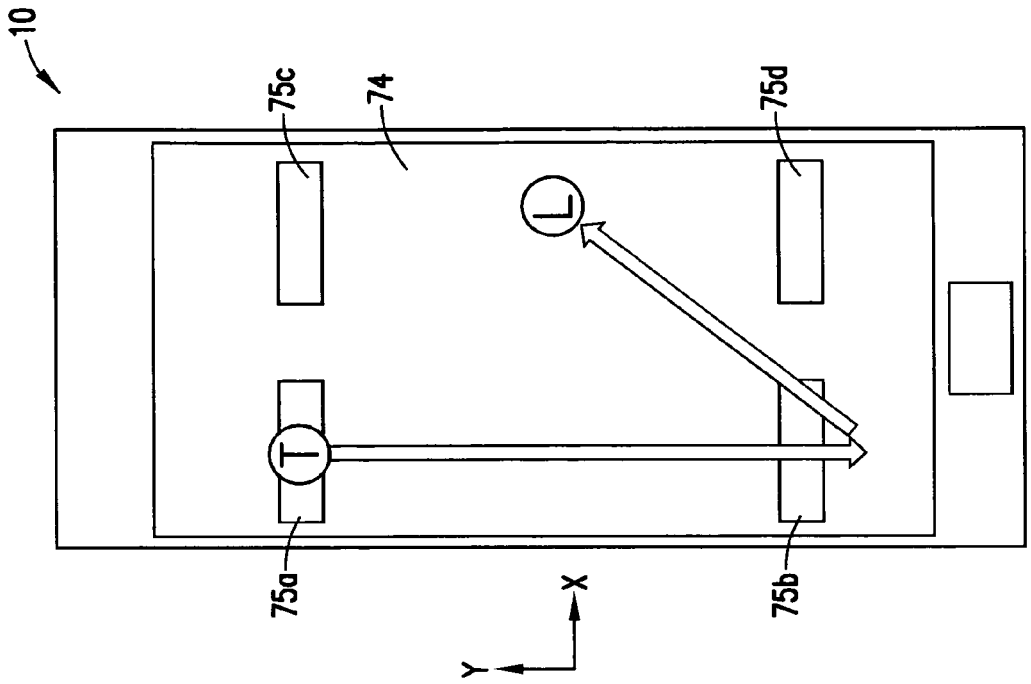
FIG. 11 is diagram illustrating a use case of touching an alternate example display having four piezoelectric members.

FIG. 11 shows a concept of the apparatus 10 where there are four piezos 75a-75b under the display 74. All of the piezos are connected to the display 74 from the middle and to the housing 12 from the ends. With this mechanism, movement of the finger on the device's x-axis can also be measured. When the display is touched at location T, piezo 75a provides the highest voltage. When the finger is moved on the display towards the device bottom end, the relative voltage between the piezos changes. The same happens when the finger is moved towards the top and right side of the device. The apparatus may be able to recognize the gesture T-L shown in FIG. 11 on the touchscreen display 74 which is otherwise OFF, and perform a predetermined function based upon that recognized gesture.

Figure 12:
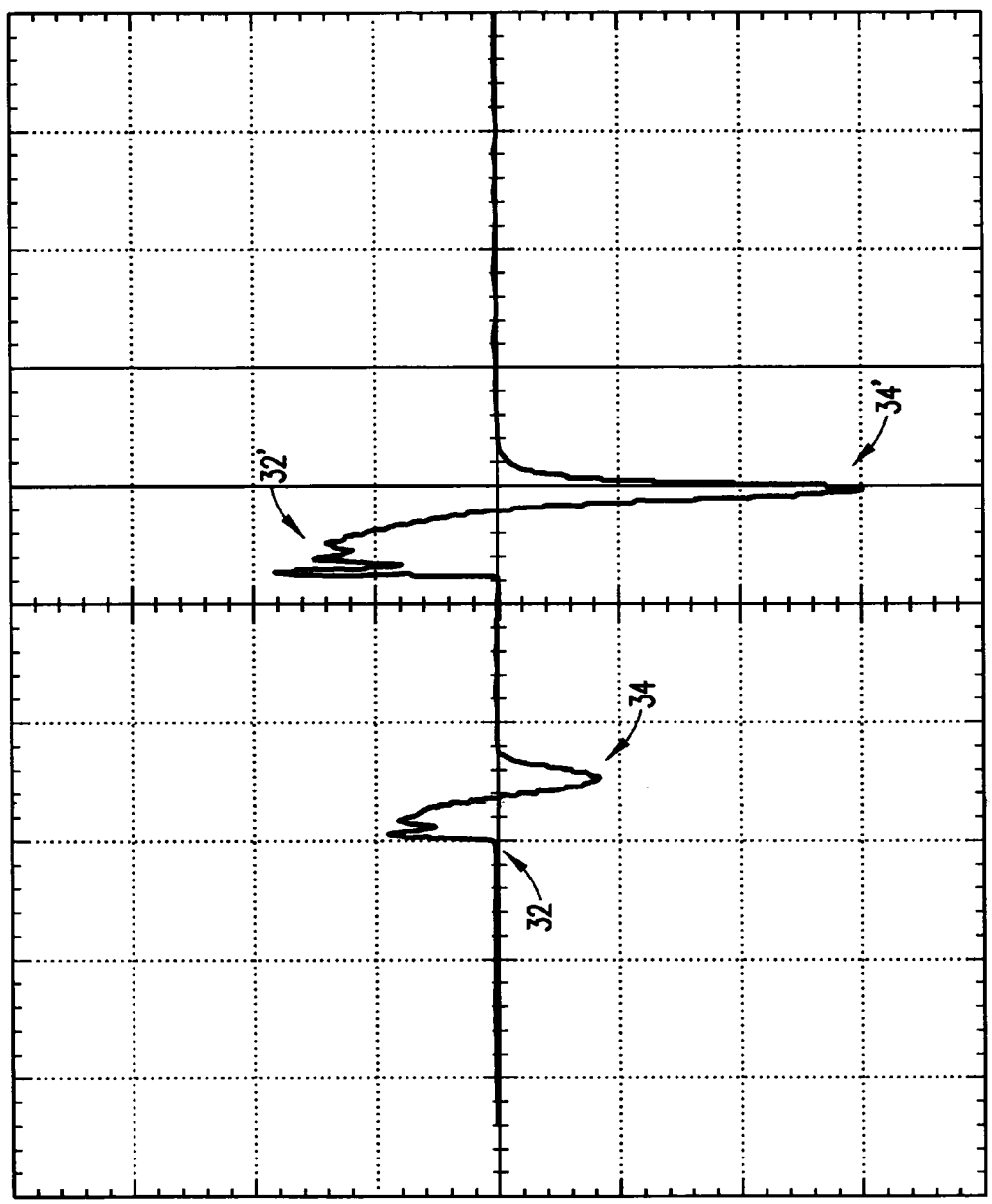
FIG. 12 is a graph illustrating a voltage from a piezoelectric member under a display corresponding to a touch and release using two different size forces.

As the voltage measured from the piezos depends on the "amount" of bending (stress) of the piezo, it is possible to distinguish between touches of different strengths of force. FIG. 12 shows the voltage as a function of time when the apparatus 10 is touched using first a "normal" touch UI force 32 and then released 34, and then touched again 32' using more force and then released 34'.

Figure 13:
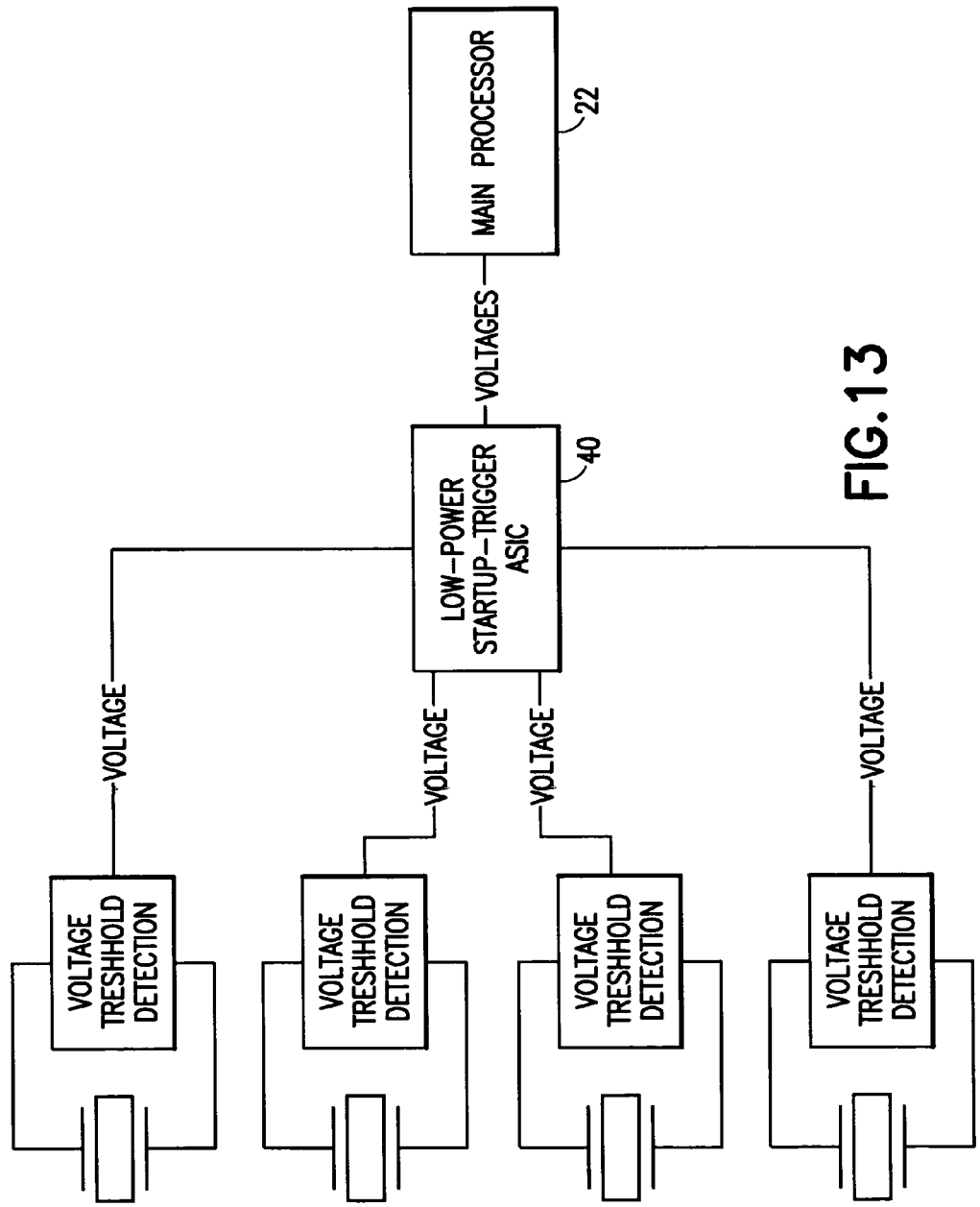
FIG. 13 is a diagram illustrating a first type of method of using the voltage(s) from the piezoelectric members.

Referring also to FIG. 13, one approach is to provide the apparatus 10 with an application-specific integrated circuit (ASIC) 40 designed for the purpose that wakes up when a certain voltage has been reached in any of the four piezos shown. The examples in FIGS. 13-15 work equally well with the apparatus 10 having only two piezos. That ASIC 40 may then be used to wake up the main processor 22 and pass the voltage values to the main processor 22 for further processing.

Figure 14:
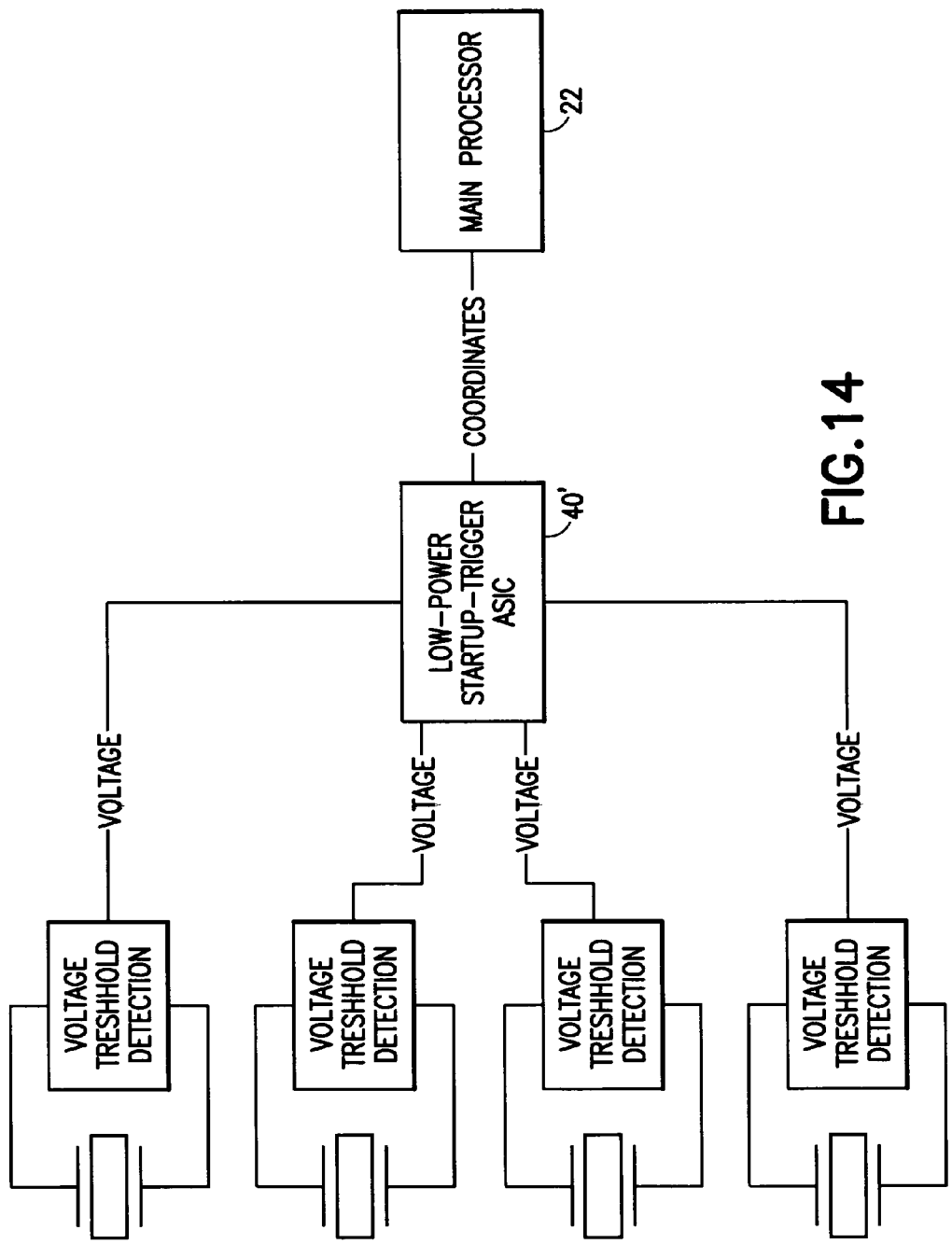
FIG. 14 is a diagram illustrating a second type of method of using the voltage(s) from the piezoelectric members.

Referring also to FIG. 14, another approach is that there is an ASIC 40' designed for this purpose that wakes up when a predetermined voltage has been reached in any of the piezos. That ASIC 40' may then wake up the main processor 22, analyze the voltages and pass the touch coordinates to the main processor (x, y, z) for further processing. The ASIC may have a programmable CPU and memory so that it can adapt to different manufacturing device sizes and shapes and piezo positions.

Figure 15:
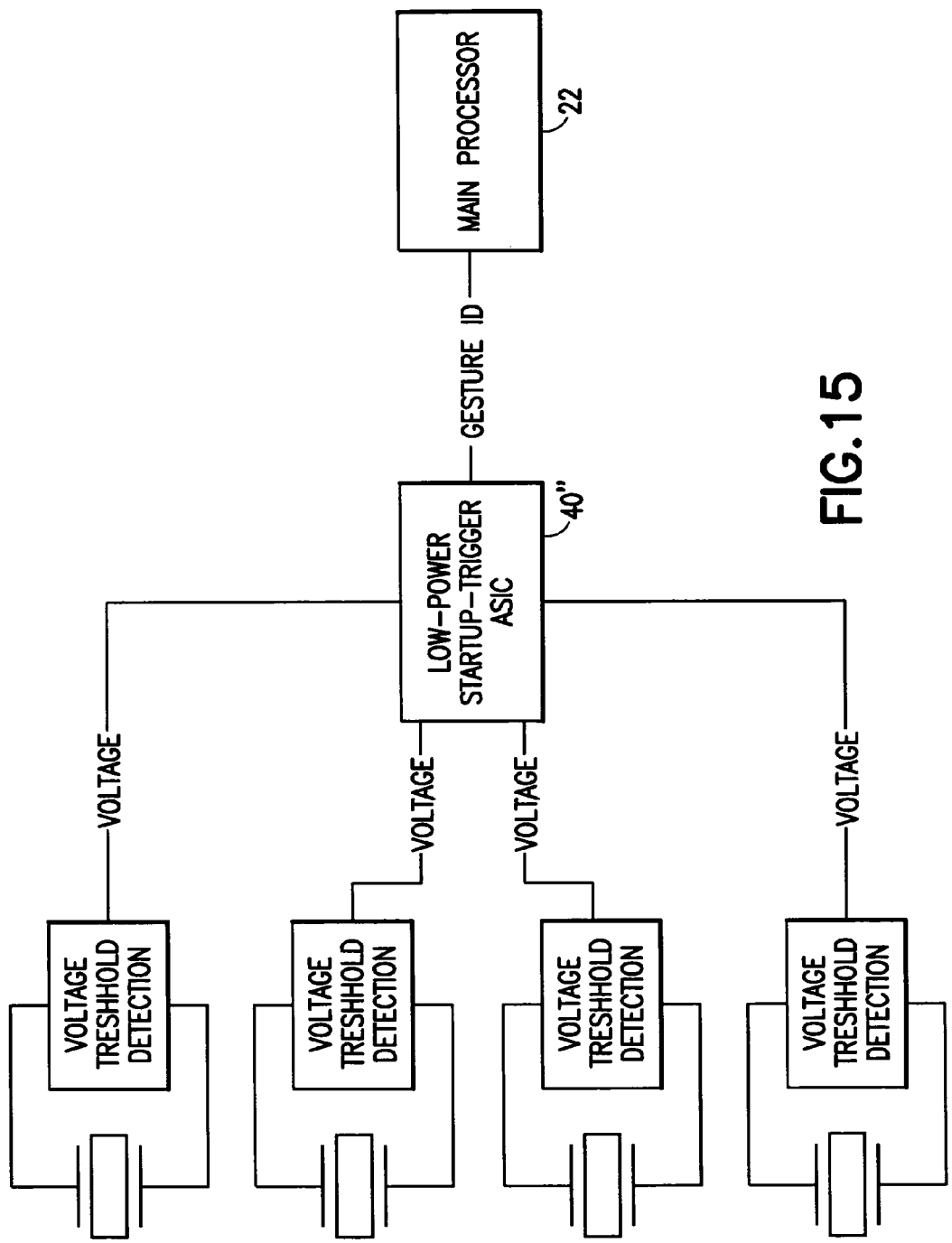
FIG. 15 is a diagram illustrating a third type of method of using the voltage(s) from the piezoelectric members.

Referring also to FIG. 15, a third approach is that there is an ASIC 40" designed for this purpose that wakes up when certain voltage has been reached in any of the piezos. That ASIC may then wake up the main processor 22, analyze the voltages over time, detect a gesture made with the finger, and pass that gesture ID to the main processor. One example gesture is shown in FIG. 11. The ASIC may have a programmable CPU and memory so that it can detect multiple gestures.

Figure 16:
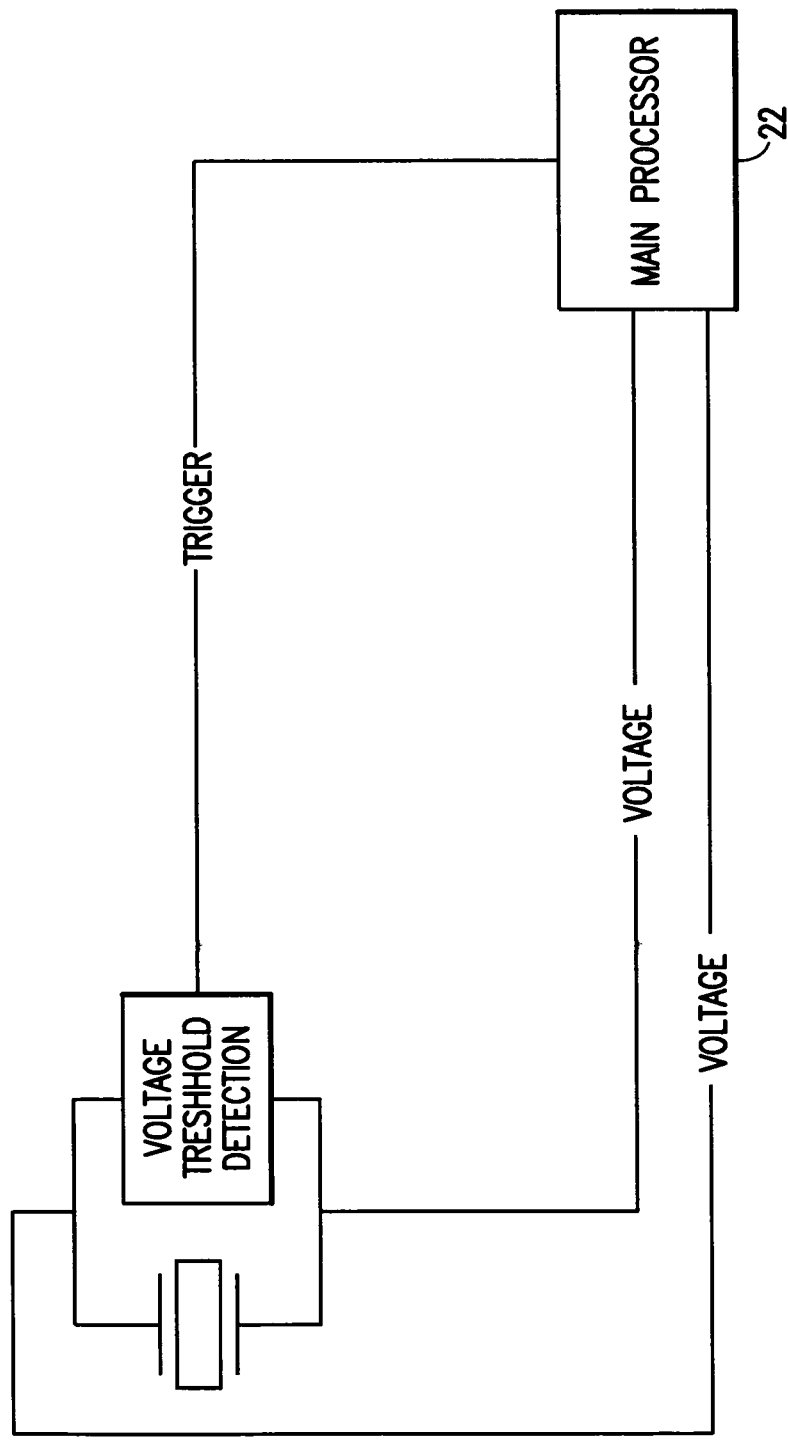
FIG. 16 is a diagram illustrating a fourth type of method of using a voltage from a piezoelectric members.

Referring also to FIG. 15, a fourth approach is that the voltage threshold detector may provide a trigger (e.g. an interrupt) in the main processor 22 that then starts reading the voltage values directly from the piezos. FIG. 16 shows a simplified example that uses just one piezo.

Features described herein enable new ways to interact with the apparatus. It enables touch based control of the apparatus without using the active capacitive touch sensor 31 of the TID 30 (see FIG. 1). Thus, the device can be locked and the user may still be able to use it. In one example, when the display 74 is switched OFF, the use cases may be limited due to a lack of visual feedback and many of them would be context dependent.

One example use case is if music is played to headphones. A swipe as described in FIG. 9 could result in decreasing music volume (by one step or by multiple steps depending on the length of the swipe). This would be practical, for example, when the user is jogging and wants to adjust the volume of the apparatus in a pocket. These features allow an apparatus to be provided without side volume keys, such as if volume can be adjusted from the display when display is switched ON, or using locked-swipe when the display switched OFF. Similar logic could be used for telephony audio volume control when the device is unlocked.

Another example use case is swiping sideways to result in playing a clock time to headphones or loudspeaker using text-to-speech. Thus, a person who is jogging does not have to look at the display, but would hear the clock time.

Another example use case is swiping sideways for changing a FM radio station to a next one when playing to headphones and the device is locked.

Another example use case is that a certain gesture (e.g. drawing a circle) on the display could result in unlocking the device.

In all of these examples force detection may be used while the display is OFF.

As the Tactile Audio Display construction has a floating display stack, it can be used as a button. The piezos may be used as a power button while the display 74 is OFF. When the apparatus 10 is switched OFF, and the voltage of a piezo or multiple piezos goes over a certain threshold, a separate ASIC 40 may be started up and then wake up and start a normal boot-up process. In an alternate example the display and window may be rigidly connected to phone mechanics. Features as described herein are not limit to a floating display stack, but take into account also embodiments comprising rigid and substantially rigid connections between the glass and the device frame. The performance is not the same, but some use cases may be done with a more rigid connection too.

Figure 18:
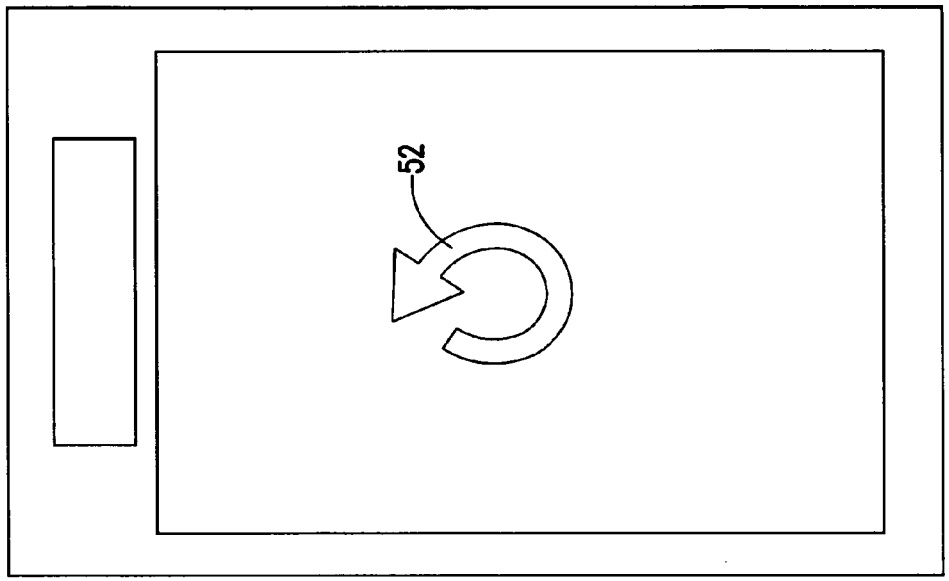
FIG. 18 is a diagram of the apparatus shown in FIGS. 1 and 5 indicating a motion for a user to copy by touch on the display for a boot-up process after an additional user interface (UI) item is pressed.
Figure 17:
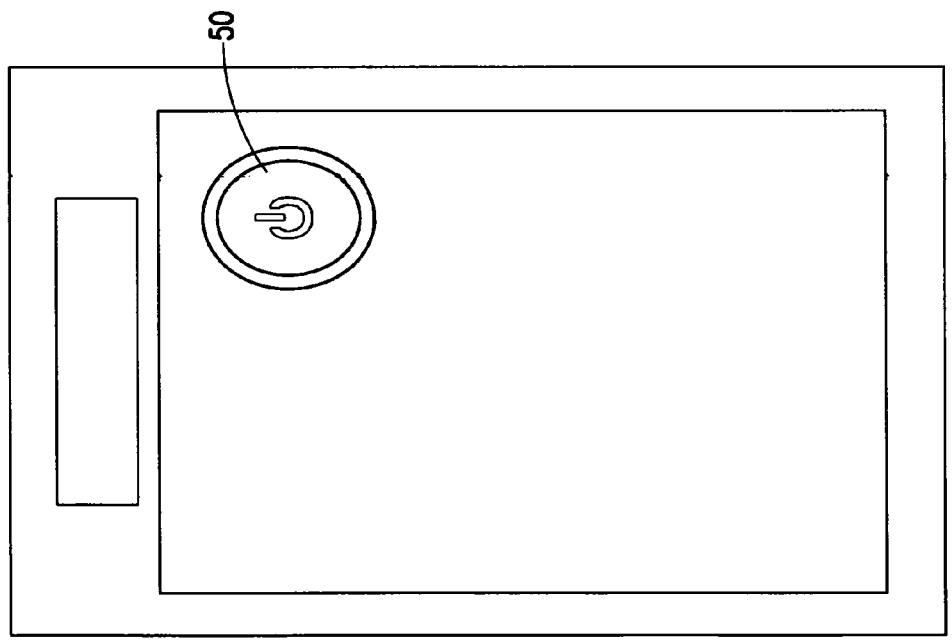
FIG. 17 is a diagram of the apparatus shown in FIGS. 1 and 5 indicating a location for a user to touch for a boot-up process after an additional user interface (UI) item is pressed.

In order to avoid accidental boot-up, for example if the phone is in the back pocket of a person's jeans, the apparatus may be configured such that the actual boot-up process may start only after an additional user interface (UI) item 50 is pressed (requires touch and display to work) as in FIG. 17 or an additional gesture 52 is done (requires touch to work) as in FIG. 18. This would be a likely use case, but as described in this application, gestures can be recognized also without touch so using a touch sensor (such as 31 shown in FIG. 1 for example) is not a requirement.

The boot-up can be also done as a series of presses. For example, long strong press initiates the process and an additional double tap (detected using the piezos or accelerometer) would then result in the actual start of the boot-up process. This use case is not limited to any specific gesture or frequency of taps.

Figure 19:
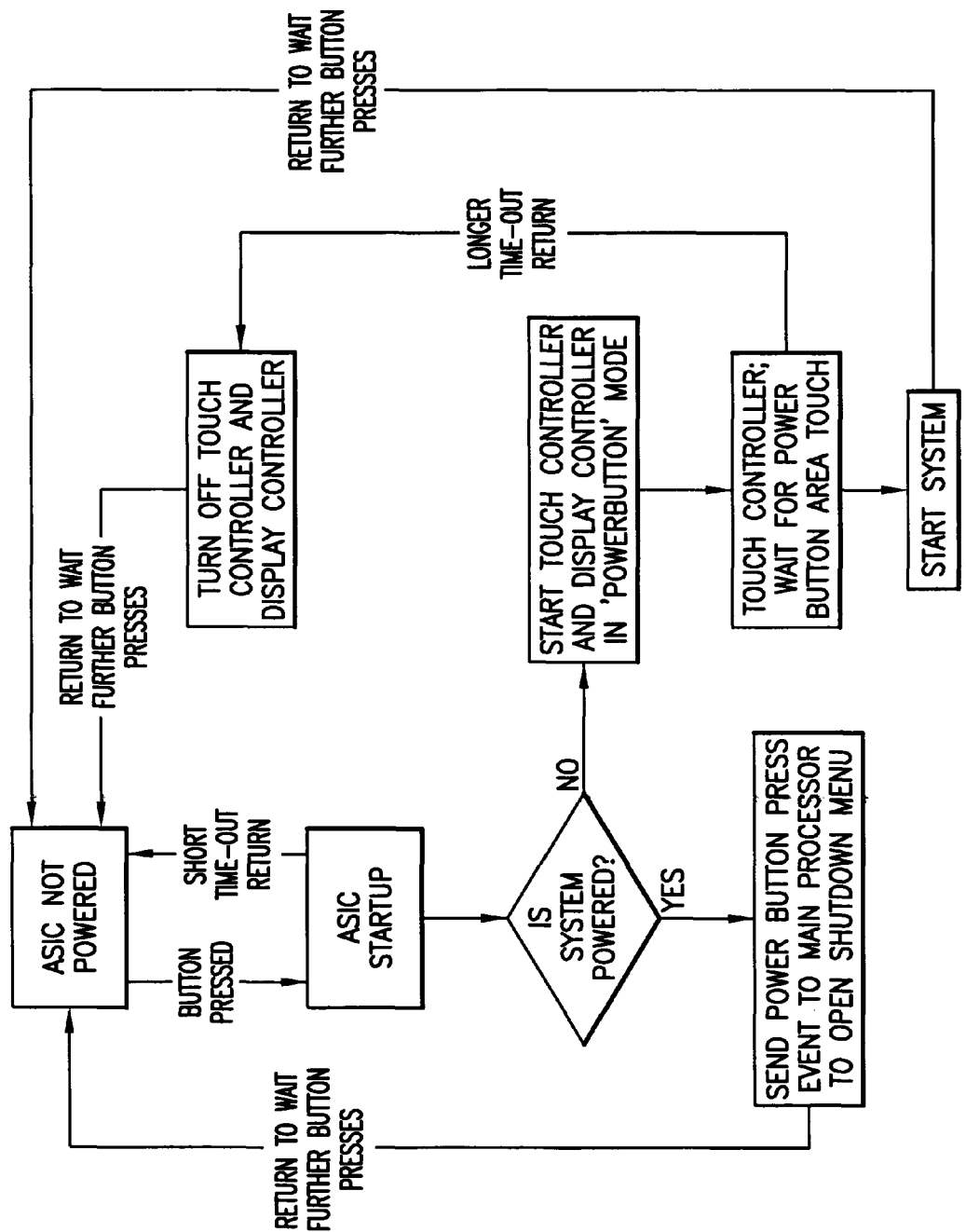
FIG. 19 is a chart of an example method.

The apparatus shut-down could be done respectively. FIG. 19 shows an example of an overall process and includes the shutdown and the UI for that. The ASIC works as described in FIG. 15 with the addition that it can send a boot-up signal to main processor.

Figure 20:
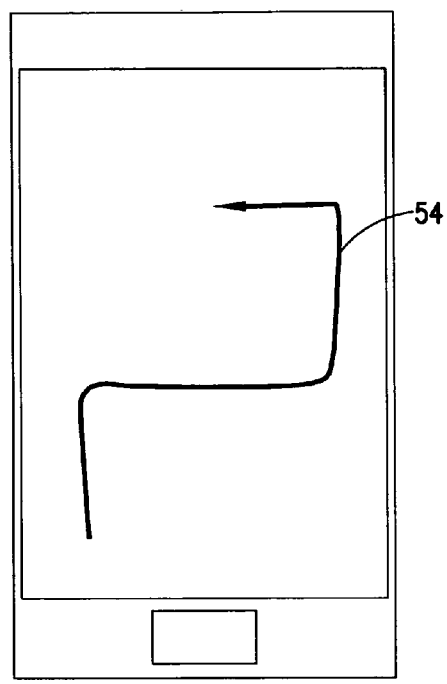
FIG. 20 is a diagram of the apparatus shown in FIGS. 1 and 5 illustrating a motion of a finger on the display which may be used to unlock the apparatus.

Features may also be used to enter the security code without the need to first unlock the device and thus enable touch sensor 31. Here the use case enables a pattern being entered without first unlocking the apparatus (see FIG. 20 that shows an example finger movement path 54 on an unlocked display). This with one gesture 54 the user can both unlock the device and be entry of the security code. This would be a lot faster than in a conventional device, such as in a Windows Phone. In a Windows Phone, for example, the user needs to:

Press power button to unlock
Swipe up to enter the security code application
Enter the 5 digit security code Naturally, the user may have a way to define his/her own security pattern. This method does not necessarily have to be mutually exclusive with the existing one, but would offer a faster alternative.

Figure 21:
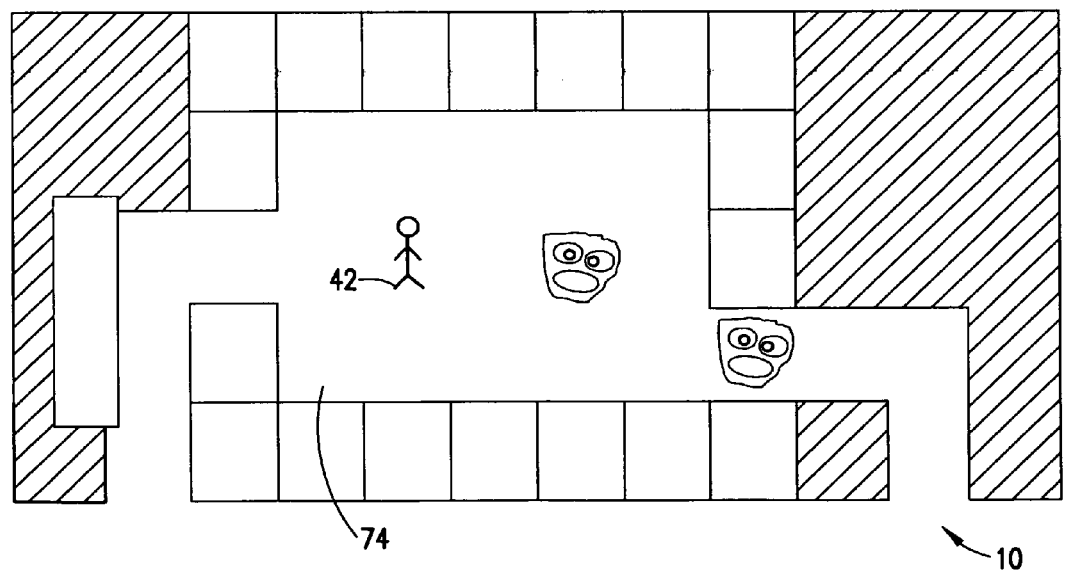
FIG. 21 is a diagram of the apparatus shown in FIGS. 1 and 5 to illustrate using the display module as an input without powering the capacitive touch sensor.

The mentioned technology can be used also for example, as a low-power game control. FIG. 21 shows an example where the user could move his/her character 42 in the dungeon by tapping different parts of the display 74. There is no need to enable the touch sensor 31 that consumes power since the zero-power non-capacitive touch using the piezos can do that instead. Another example of game control would be a minigolf game where the strength of the press may signal the power of the putt and the location of the touch indicates the direction of the putt.

Figure 22:
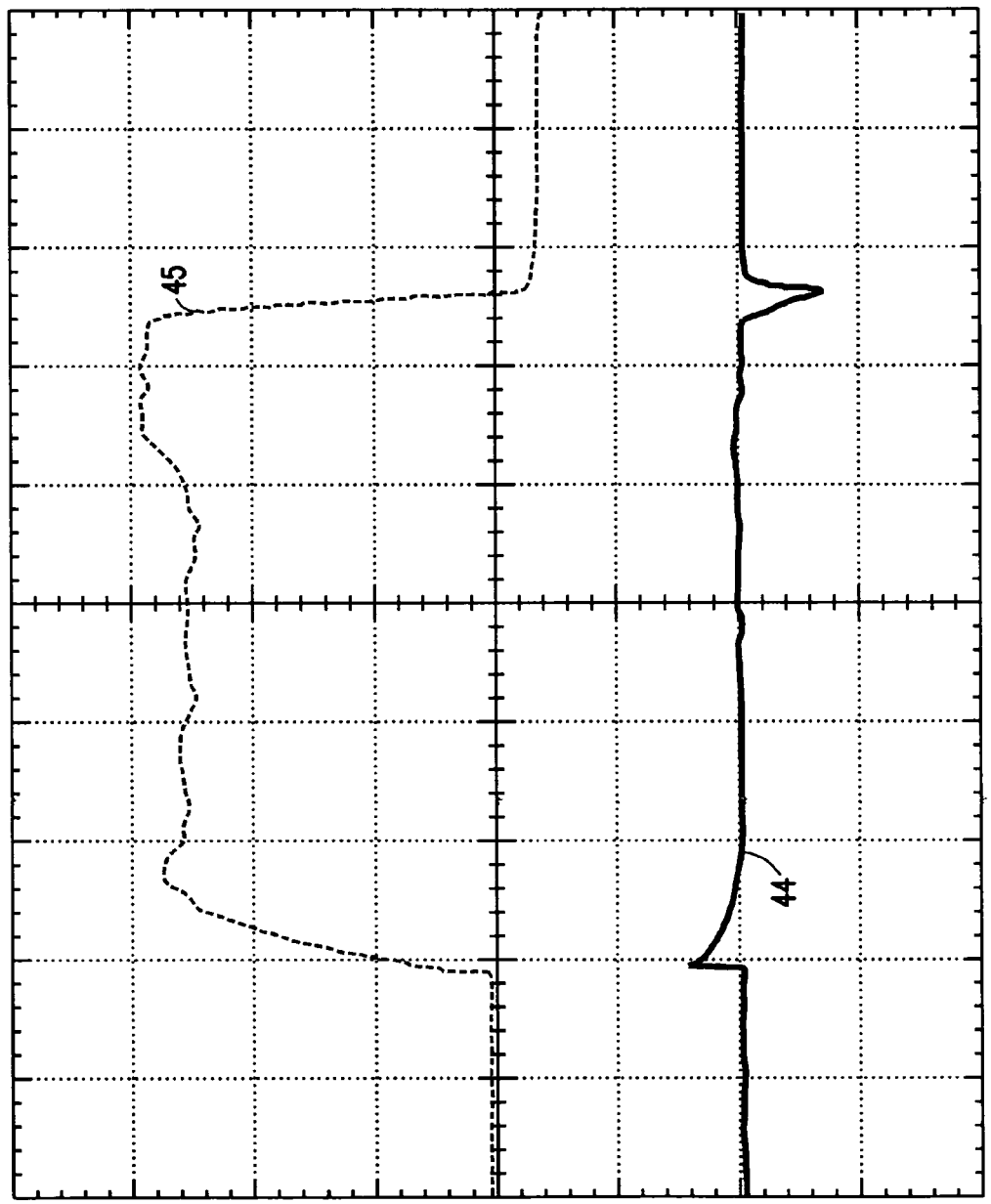
FIG. 22 is a diagram illustrating voltages with different resistances.

As described above, the measurements have been done using a 10 kOhm resistor, but if the impedance would be higher, then the leakage current would be smaller and static force would be easier to measure. FIG. 22 shows two graphs. 44 illustrates the voltage measured using the 10 kOhm resistor and 45 illustrates the voltage using the oscilloscope's internal resistor which is higher than 100 kOhm. With higher impedance, the static force can be measured over much longer period of time. All the use cases can be implemented using a smaller impedance as described above, although only the changes can be reliably detected.

Features as described herein may utilize piezoelectric actuators under the display (Tactile Audio Display construction) to detect touch location and touch force on the display. This may include utilizing the knowledge of the touch information to conclude UI gestures. This may include utilizing the force sensing provided by piezos to use the display stack as a button and, more specifically, as an apparatus ON power button. Since the piezos can create electric charge, this solution may be used as a zero-power touch sensor. In some use cases this may replace utilizing the touch sensor 31. One good example use case is when the device is locked and display (including the touch sensor 31) is switched OFF.

Features may be used to provide touch detection without any power consumption from the touch sensor. Features may be used to utilizing the display stack as a button (such as a power button for example). Features may be used to provide two or more piezoelectric actuators under the display to detect touch location and force on the display, detect the movement of an object on the display, and recognize movement patterns on the display.

Since piezos can create electric charge as a result of mechanical stress, that feature can be used to trigger some functionality in the device. For example, the functionality may comprise waking a CPU that is in sleep mode. As a result of that, this mechanism can be used instead the touch sensor 31 at least in some use cases resulting in better power efficiency for the apparatus 10. This may provide a functional alternative for touch sensor 31 that does not use any power, because the construction itself produces electric charge. This enables the display stack to be used as a button without a need for a physical button.

An example embodiment may be provided comprising a display; and at least one piezoelectric member connected to the display, where the at least one piezoelectric member is configured to move the display, where, when the display is pressed to mechanically stress the at least one piezoelectric member, the apparatus is configured to: wake up the apparatus from a sleep mode based upon electricity from the at least one piezoelectric member, and/or determine a location where the display was pressed based upon respective signals from at least two of the piezoelectric members, and/or determine a force and/or impulse applied from a voltage measured from the at least one piezoelectric member.

The display may be an electronic display which is part of a panel speaker formed by the display and the at least one piezoelectric member. The at least one piezoelectric member may be connected to circuitry of the apparatus to supply the electricity to the circuitry, and where the circuitry is configured to wake up a processor of the apparatus based upon receiving a predetermined voltage from the at least one piezoelectric member. Based upon receiving the predetermined voltage from the at least one piezoelectric member, the circuitry may be configured to supply a voltage value to the processor for processing. The circuitry may be configured to analyze the voltage(s) from the at least one piezoelectric member and signal the processor of coordinates where the display was pressed. The circuitry may be configured to analyze the voltages from the at least two piezoelectric members over time, determine a gesture as the press moves on the display, and signal a gesture identification to the processor. The circuitry may be configured to send a trigger signal to the processor to wake up the processor, and the processor is configured to read the voltage(s) directly from the at least one piezoelectric member. The display may comprise a touch input device (TID) comprising a touch sensor, where the apparatus is configured to wake up the apparatus from the sleep mode and/or determine the location where the display was pressed when the touch input device is not powered. The apparatus may comprise at least one processor, and at least one memory having software, where the processor(s), the memory(ies) and the software are configured to perform a predetermined function based upon the touch input device not being powered and a predetermined pressing motion along the display being determined based upon the respective signals from the at least two piezoelectric members. The apparatus may be configured to wake up the apparatus from the sleep mode, based upon the electricity from the at least one piezoelectric member, when within a predetermined time of the display being pressed: an additional user input item is actuated, and/or a predetermined touch gesture along the display is determined. The display may comprise a touch input device (TID) comprising a touch sensor, where a state of the apparatus is configured to be changed from locked to unlocked, while the touch input device is not powered, by a predetermined touch gesture along the display being determined from the respective signals from the at least two piezoelectric members. The display may comprise a touch input device (TID) comprising a touch sensor, where the apparatus is configured to operate an application, while the touch input device is not powered, with input signals to the application from the at least one piezoelectric member generated by a user pressing on the display and sending the input signals from the at least one piezoelectric member based upon the pressing. The apparatus may further comprise a battery, at least one printed wiring board including a transmitter and a receiver, at least one processor, and at least one memory comprising software, where the software comprises a telephone application.

An example method may comprise pressing a display of an apparatus to mechanically stress at least one piezoelectric member connected to the display; and generating electricity from the at least one piezoelectric member from the mechanical stress to: wake up the apparatus from a sleep mode, and/or determine a location where the display was pressed based upon the respective electricity from at least two of the piezoelectric members.

The at least one piezoelectric member may be connected to circuitry of the apparatus to supply the electricity to the circuitry, where the circuitry wakes up a processor of the apparatus based upon receiving a predetermined voltage from the at least one piezoelectric member, where: based upon receiving the predetermined voltage from the at least one piezoelectric member, the circuitry supplies a voltage value to the processor for processing, and/or the circuitry analyzes the voltage(s) from the at least one piezoelectric member and signals the processor of coordinates where the display was pressed, and/or the circuitry analyzes the voltages from the at least two piezoelectric members over time, and determines a gesture as the press moves on the display, and signals a gesture identification to the processor, and/or the circuitry sends a trigger signal to the processor to wake up the processor, and the processor directly reads the voltage(s) from the at least one piezoelectric member. The display may comprise a touch input device (TID) comprising a touch sensor, where the apparatus wakes up the apparatus from the sleep mode and/or determines the location where the display was pressed when the touch input device is not powered. The apparatus may comprise at least one processor, and at least one memory having software, where the processor(s), the memory(ies) and the software perform a predetermined function based upon the touch input device not being powered and a predetermined pressing motion along the display being determined. The apparatus may wake up from the sleep mode, based upon the electricity from the at least one piezoelectric member, when within a predetermined time of the display being pressed: an additional user input item is actuated, and/or a predetermined touch gesture along the display is determined. The display may comprise a touch input device (TID) comprising a touch sensor: where a state of the apparatus is changed from locked to unlocked, while the touch input device is not powered, by a predetermined touch gesture along the display being determined from the respective signals from the at least two piezoelectric members, and/or where the apparatus operates an application, while the touch input device is not powered, with input signals to the application from the at least one piezoelectric member generated by a user pressing on the display and sending the input signals from the at least one piezoelectric member based upon the pressing.

A non-transitory program storage device, such as memory 24 for example, readable by a machine, tangibly embodying a program of instructions executable by the machine for performing operations may be provided, the operations comprising: waking up an apparatus from a sleep mode based upon electricity from the at least one piezoelectric member which has been mechanically stressed to generate the electricity from pressing of a display of the apparatus connected to the at least one piezoelectric member, and/or determining a location where the display was pressed based upon respective electricity from at least two of the piezoelectric members generated by the pressing of the display.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    a display; and
    at least one piezoelectric member connected to the display, where the at least one piezoelectric member is configured to move at least a portion of the display,
    where, when the display is pressed to mechanically stress the at least one piezoelectric member, the apparatus is configured to:
        wake up the apparatus from a sleep mode based upon electricity from the at least one piezoelectric member, where the at least one piezoelectric member is connected to circuitry of the apparatus to supply the electricity to the circuitry, and where the circuitry is configured to wake up a processor of the apparatus based upon receiving a predetermined voltage from the at least one piezoelectric member, and
        determine a location where the display was pressed based upon respective signals from at least two of the piezoelectric members, where the circuitry is configured to analyze the voltages from the at least two of the piezoelectric members over time, determine a gesture as the press moves on the display, and signal a gesture identification to the processor.

2. An apparatus as in claim 1 where the display is an electronic display which is part of a panel speaker formed by the display and the at least one piezoelectric member.

3. An apparatus as in claim 1 where, based upon receiving the predetermined voltage from the at least one piezoelectric member, the circuitry is configured to supply a voltage value to the processor for processing.

4. An apparatus as in claim 1 where the circuitry is configured to analyze the voltage from the at least one piezoelectric member and signal the processor coordinates of where the display was pressed.

5. An apparatus as in claim 1 where the circuitry is configured to send a trigger signal to the processor to wake up the processor, and the processor is configured to read the voltage directly from the at least one piezoelectric member.

6. An apparatus as in claim 1 where the display comprises a touch input device (TID) comprising a touch sensor, where the apparatus is configured to wake up the apparatus from the sleep mode and/or determine a location where the display was pressed when the touch input device is not powered.

7. An apparatus as in claim 6 where the apparatus comprises at least one processor, and at least one memory having software, where the at least one processor, the at least one memory and the software are configured to perform a predetermined function based upon the touch input device not being powered and a predetermined pressing motion along the display being determined based upon the respective signals from the at least two piezoelectric members.

8. An apparatus as in claim 1 where the apparatus is configured to wake up the apparatus from the sleep mode, based upon the electricity from the at least one piezoelectric member, when within a predetermined time of the display being pressed:
an additional user input item is actuated, and/or
a predetermined touch gesture along the display is determined.

9. An apparatus as in claim 1 where the display comprises a touch input device (TID) comprising a touch sensor, where a state of the apparatus is configured to be changed from locked to unlocked, while the touch input device is not powered, by a predetermined touch gesture along the display being determined from the respective signals from the at least two piezoelectric members.

10. An apparatus as in claim 1 where the display comprises a touch input device (TID) comprising a touch sensor, where the apparatus is configured to operate an application, while the touch input device is not powered, with input signals to the application from the at least one piezoelectric member generated by a user pressing on the display and sending the input signals from the at least one piezoelectric member based upon the pressing.

11. An apparatus as in claim 1 where the apparatus further comprises a battery, at least one printed wiring board including a transmitter and a receiver, at least one processor, and at least one memory comprising software, where the software comprises a telephone application.

12. An apparatus as in claim 1 where, when the display is pressed to mechanically stress the at least one piezoelectric member, the apparatus is configured to determine a force and/or impulse applied from a voltage measured from the at least one piezoelectric member.

13. A method comprising:
pressing a display of an apparatus to mechanically stress at least one piezoelectric member connected to the display; and
generating electricity from the at least one piezoelectric member from the mechanical stress to:
wake up the apparatus from a sleep mode, where the at least one piezoelectric member is connected to circuitry of the apparatus to supply the electricity to the circuitry, where the circuitry wakes up a processor of the apparatus based upon receiving a predetermined voltage from the at least one piezoelectric member, and
determine a location where the display was pressed based upon respective signals from at least two of the piezoelectric members, where the circuitry analyzes the voltages from the at least two piezoelectric members over time, and determines a gesture as the press moves on the display, and signals a gesture identification to the processor.

14. A method as in claim 13, where:
based upon receiving the predetermined voltage from the at least one piezoelectric member, the circuitry supplies a voltage value to the processor for processing, and/or
the circuitry analyzes the voltage from the at least one piezoelectric member and signals the processor coordinates of where the display was pressed, and/or
the circuitry sends a trigger signal to the processor to wake up the processor, and the processor directly reads the voltage from the at least one piezoelectric member.

15. A method as in claim 13 where the display comprises a touch input device (TID) comprising a touch sensor, where the apparatus wakes up from the sleep mode and/or determines the location where the display was pressed when the touch input device is not powered.

16. A method as in claim 13 where the apparatus comprises at least one processor, and at least one memory having software, where the at least one processor, the at least one memory, and the software perform a predetermined function based upon the touch input device not being powered and a predetermined pressing motion along the display being determined.

17. A method as in claim 13 where the apparatus wakes up from the sleep mode, based upon the electricity from the at least one piezoelectric member, when within a predetermined time of the display being pressed:
an additional user input item is actuated, and/or
a predetermined touch gesture along the display is determined.

18. A method as in claim 13 where the display comprises a touch input device (TID) comprising a touch sensor:
where a state of the apparatus is changed from locked to unlocked, while the touch input device is not powered, by a predetermined touch gesture along the display being determined from the respective signals from the at least two piezoelectric members, and/or
where the apparatus operates an application, while the touch input device is not powered, with input signals to the application from the at least one piezoelectric member generated by a user pressing on the display and sending the input signals from the at least one piezoelectric member based upon the pressing.

19. A method as in claim 13 where the generating electricity from the at least one piezoelectric member from the mechanical stress uses the electricity for:
determining a force and/or impulse applied from a voltage measured from the at least one piezoelectric member.

20. A non-transitory program storage device readable by a machine, tangibly embodying a program of instructions executable by the machine for performing operations, the operations comprising:
waking up an apparatus from a sleep mode based upon electricity from the at least one piezoelectric member which has been mechanically stressed to generate the electricity from pressing of a display of the apparatus connected to the at least one piezoelectric member, where the at least one piezoelectric member is connected to circuitry of the apparatus to supply the electricity to the circuitry, where the circuitry wakes up a processor of the apparatus based upon receiving a predetermined voltage from the at least one piezoelectric member, and
determining a location where the display was pressed based upon respective signals from at least two of the piezoelectric members, where the circuitry analyzes the voltages from the at least two piezoelectric members over time, and determines a gesture as the press moves on the display, and signals a gesture identification to the processor.

21. A non-transitory program storage device as in claim 20 where the operations further comprise:
   determining a force and/or impulse applied from a voltage measured from the at least one piezoelectric member.

22. A non-transitory program storage device as in claim 20, where based upon receiving the predetermined voltage from the at least one piezoelectric member, the circuitry is configured to supply a voltage value to the processor for processing.

23. A non-transitory program storage device as in claim 20, where the circuitry is configured to analyze the voltage from the at least one piezoelectric member and signal the processor coordinates of where the display was pressed.

24. A non-transitory program storage device as in claim 20, where the circuitry is configured to send a trigger signal to the processor to wake up the processor, and the processor is configured to read the voltage directly from the at least one piezoelectric member.

\* \* \* \* \*